United States Patent
Tang

(10) Patent No.: US 9,082,458 B1
(45) Date of Patent: Jul. 14, 2015

(54) DATA STORAGE DEVICE BALANCING AND MAXIMIZING QUALITY METRIC WHEN CONFIGURING ARIAL DENSITY OF EACH DISK SURFACE

(71) Applicant: Western Digital Technologies, Inc., Irvine, CA (US)

(72) Inventor: Kathy X. Tang, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/203,126

(22) Filed: Mar. 10, 2014

(51) Int. Cl.
*G11B 27/36* (2006.01)
*G11B 20/12* (2006.01)
*G11B 20/10* (2006.01)

(52) U.S. Cl.
CPC .......... *G11B 27/36* (2013.01); *G11B 20/10009* (2013.01); *G11B 20/1258* (2013.01); *G11B 2020/1278* (2013.01)

(58) Field of Classification Search
None
See application file for complete search history.

(56) References Cited

U.S. PATENT DOCUMENTS

| | | | |
|---|---|---|---|
| 4,945,427 A | 7/1990 | Cunningham | |
| 5,596,458 A | 1/1997 | Emo et al. | |
| 5,739,994 A | 4/1998 | Ottesen et al. | |
| 5,812,755 A | 9/1998 | Kool et al. | |
| 5,870,237 A | 2/1999 | Emo et al. | |
| 5,930,069 A | 7/1999 | Kim | |
| 5,940,237 A | 8/1999 | Takagi | |
| 5,949,603 A | 9/1999 | Brown et al. | |
| 5,956,196 A | 9/1999 | Hull et al. | |
| 5,999,352 A * | 12/1999 | Teck et al. | 360/48 |
| 6,005,725 A | 12/1999 | Emo et al. | |
| 6,018,789 A | 1/2000 | Sokolov et al. | |
| 6,052,250 A | 4/2000 | Golowka et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,084,738 A | 7/2000 | Duffy | |
| 6,091,559 A | 7/2000 | Emo et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,118,604 A | 9/2000 | Duffy | |
| 6,130,796 A | 10/2000 | Wiselogel | |
| 6,137,644 A | 10/2000 | Hetzler et al. | |
| 6,145,052 A | 11/2000 | Howe et al. | |
| 6,172,839 B1 | 1/2001 | Ahn | |
| 6,175,893 B1 | 1/2001 | D'Souza et al. | |
| 6,178,056 B1 | 1/2001 | Cloke et al. | |
| 6,182,250 B1 | 1/2001 | Ng et al. | |
| 6,191,909 B1 | 2/2001 | Cloke et al. | |
| 6,195,218 B1 | 2/2001 | Guttmann et al. | |
| 6,205,494 B1 | 3/2001 | Williams | |

(Continued)

*Primary Examiner* — Dismery Mercedes

(57) ABSTRACT

A data storage device is disclosed comprising a plurality of disk surfaces, and a head actuated over each disk surface. For each disk surface, a quality metric is measured at a plurality of discrete areal densities including a first areal density comprising a first radial density and a first linear density, and a second areal density comprising a second radial density different from the first radial density and a second linear density different from the first linear density. Based on a target capacity, an areal density is selected for each disk surface such that the combined areal densities satisfies the target capacity and such that the quality metrics across the disk surfaces are substantially equal and substantially maximized.

20 Claims, 5 Drawing Sheets

(56) References Cited

U.S. PATENT DOCUMENTS

| | | |
|---|---|---|
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,249,854 B1 | 6/2001 | Fukuhisa et al. |
| 6,256,160 B1 | 7/2001 | Liikanen et al. |
| 6,256,695 B1 | 7/2001 | Williams |
| 6,262,857 B1 | 7/2001 | Hull et al. |
| 6,263,459 B1 | 7/2001 | Schibilla |
| 6,278,568 B1 | 8/2001 | Cloke et al. |
| 6,279,089 B1 | 8/2001 | Schibilla et al. |
| 6,289,172 B1 | 9/2001 | Windrem et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,285 B1 | 11/2001 | Bi et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,396,654 B2 | 5/2002 | Jeong et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,521 B1 | 9/2002 | Schaff et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,493,176 B1 | 12/2002 | Deng et al. |
| 6,499,083 B1 | 12/2002 | Hamlin |
| 6,516,401 B2 | 2/2003 | Fukuhisa et al. |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,560,052 B2 | 5/2003 | Ng et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,680,609 B1 | 1/2004 | Fang et al. |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,036 B2 | 6/2004 | Quak et al. |
| 6,751,402 B1 | 6/2004 | Elliott et al. |
| 6,757,481 B1 | 6/2004 | Nazarian et al. |
| 6,765,737 B1 | 7/2004 | Lim et al. |
| 6,765,744 B2 | 7/2004 | Gomez et al. |
| 6,772,281 B2 | 8/2004 | Hamlin |
| 6,778,343 B2 | 8/2004 | Nunnelley |
| 6,781,826 B1 | 8/2004 | Goldstone et al. |
| 6,782,449 B1 | 8/2004 | Codilian et al. |
| 6,788,489 B1 | 9/2004 | Chang et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,972 B1 | 9/2005 | Chue et al. |
| 6,943,978 B1 | 9/2005 | Lee |
| 6,948,165 B1 | 9/2005 | Luu et al. |
| 6,950,256 B2 | 9/2005 | Kadokawa |
| 6,950,267 B1 | 9/2005 | Liu et al. |
| 6,954,733 B1 | 10/2005 | Ellis et al. |
| 6,956,710 B2 * | 10/2005 | Yun et al. .............. 360/53 |
| 6,957,379 B1 * | 10/2005 | Patapoutian et al. ....... 714/774 |
| 6,961,814 B1 | 11/2005 | Thelin et al. |
| 6,965,489 B1 | 11/2005 | Lee et al. |
| 6,965,563 B1 | 11/2005 | Hospodor et al. |

(56) References Cited

U.S. PATENT DOCUMENTS

| | | |
|---|---|---|
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,969,989 B1 | 11/2005 | Mei |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,012,771 B1 * | 3/2006 | Asgari et al. .................. 360/31 |
| 7,012,773 B2 | 3/2006 | Ashikaga et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,255 B2 | 4/2006 | Schmidt |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,471 B2 | 5/2006 | Meyer et al. |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,197 B2 | 9/2006 | Cho |
| 7,110,202 B1 | 9/2006 | Vasquez |
| 7,111,116 B1 | 9/2006 | Boyle et al. |
| 7,113,358 B2 | 9/2006 | Zayas et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,241 B2 * | 11/2006 | Che et al. ..................... 360/75 |
| 7,133,600 B1 | 11/2006 | Boyle |
| 7,136,244 B1 | 11/2006 | Rothberg |
| 7,145,740 B2 | 12/2006 | Zayas et al. |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,170,700 B1 | 1/2007 | Lin et al. |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,514 B1 | 5/2007 | Yang et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,283,316 B2 | 10/2007 | Chiao et al. |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,362,529 B2 | 4/2008 | Chiao et al. |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,392,439 B2 * | 6/2008 | Seng et al. ..................... 714/704 |
| 7,404,013 B1 | 7/2008 | Masiewicz |
| 7,406,545 B1 | 7/2008 | Rothberg et al. |
| 7,408,731 B2 | 8/2008 | Uemura et al. |
| 7,415,571 B1 | 8/2008 | Hanan |
| 7,433,143 B1 | 10/2008 | Ying et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,529,050 B2 | 5/2009 | Shen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,589,925 B1 | 9/2009 | Chiao et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,620,772 B1 * | 11/2009 | Liikanen et al. ............... 711/112 |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,685,360 B1 | 3/2010 | Brunnett et al. |
| 7,688,540 B1 * | 3/2010 | Mei et al. ..................... 360/76 |
| 7,724,461 B1 | 5/2010 | McFadyen et al. |
| 7,725,584 B1 | 5/2010 | Hanmann et al. |
| 7,730,295 B1 | 6/2010 | Lee |
| 7,733,589 B2 | 6/2010 | Wada et al. |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |

(56) References Cited

U.S. PATENT DOCUMENTS

| | | |
|---|---|---|
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,031,423 B1 | 10/2011 | Tsai et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 * | 12/2011 | Jung et al. ............. 360/48 |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,102,613 B2 | 1/2012 | Duan et al. |
| 8,116,020 B1 | 2/2012 | Lee |
| 8,116,025 B1 | 2/2012 | Chan et al. |
| 8,125,723 B1 | 2/2012 | Nichols et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,510 B1 | 12/2013 | Fallone |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 * | 1/2014 | Jung et al. ............. 360/55 |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 * | 4/2014 | Gunderson et al. ............. 360/75 |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,941,937 B1 * | 1/2015 | Toribio et al. ............. 360/31 |
| 8,941,942 B2 * | 1/2015 | Sato et al. ............. 360/75 |
| 2002/0036849 A1 * | 3/2002 | Quak et al. ............. 360/31 |
| 2002/0036853 A1 * | 3/2002 | Quak et al. ............. 360/31 |
| 2002/0039246 A1 | 4/2002 | Ding et al. |
| 2003/0135729 A1 | 7/2003 | Mason, Jr. et al. |
| 2004/0136104 A1 * | 7/2004 | Chiao et al. ............. 360/31 |
| 2004/0179292 A1 | 9/2004 | Zayas et al. |

(56) References Cited

U.S. PATENT DOCUMENTS

| | | |
|---|---|---|
| 2004/0193798 A1 | 9/2004 | Kuwamura |
| 2006/0018051 A9 | 1/2006 | Chiao et al. |
| 2006/0227445 A1 | 10/2006 | Chiao et al. |
| 2007/0064325 A1 | 3/2007 | Bi et al. |
| 2007/0127150 A1 | 6/2007 | Cho et al. |
| 2007/0223132 A1 | 9/2007 | Tsuchinaga |
| 2008/0256295 A1 | 10/2008 | Lambert et al. |
| 2009/0002872 A1 | 1/2009 | Ueda et al. |
| 2009/0113702 A1 | 5/2009 | Hogg |
| 2010/0142087 A1 | 6/2010 | Carson |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

\* cited by examiner

US 9,082,458 B1

DATA STORAGE DEVICE BALANCING AND MAXIMIZING QUALITY METRIC WHEN CONFIGURING ARIAL DENSITY OF EACH DISK SURFACE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 1:
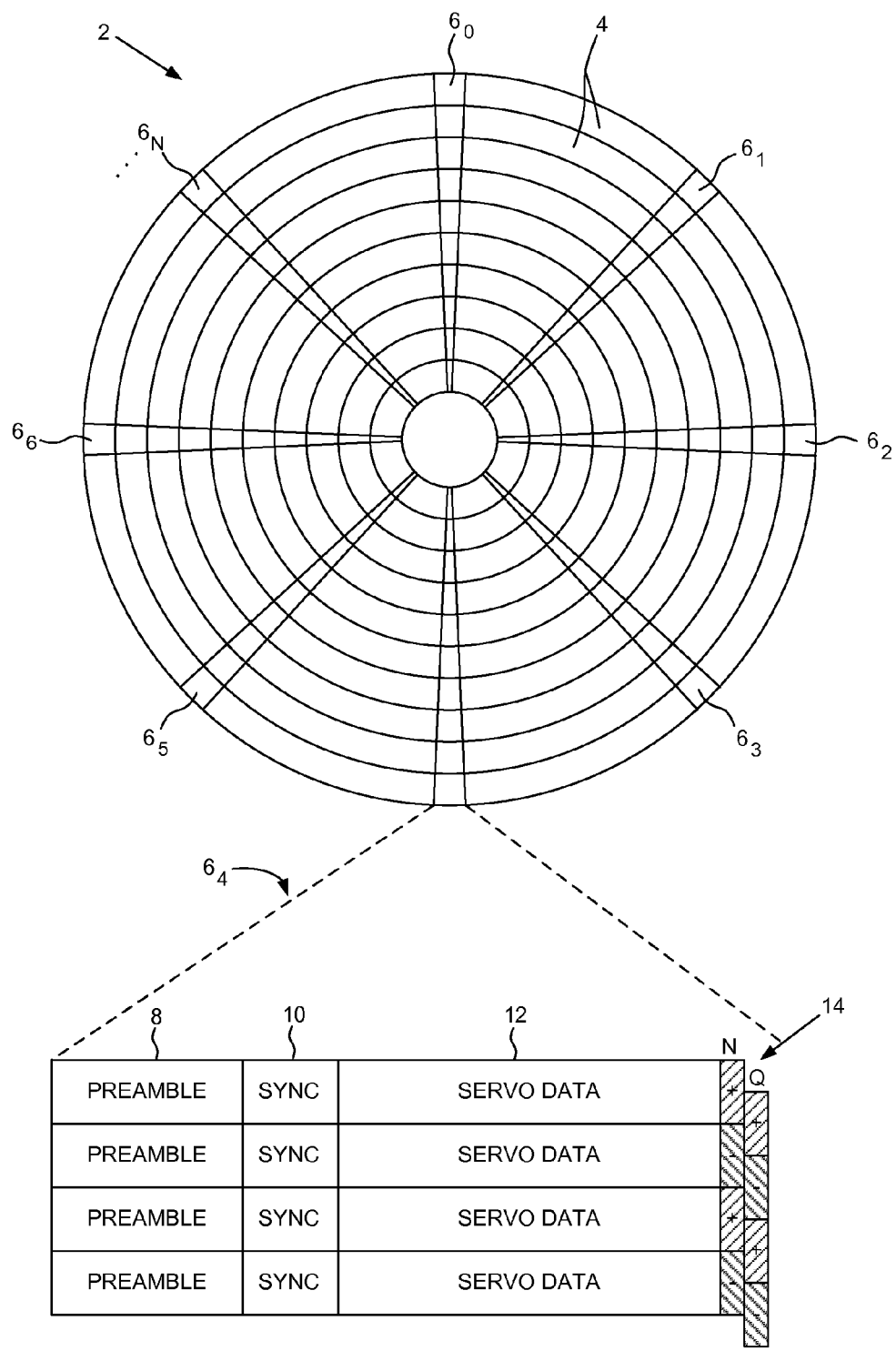
FIG. 1 shows a prior art disk format comprising a plurality of servo tracks defined by servo sectors.
Figure 2:
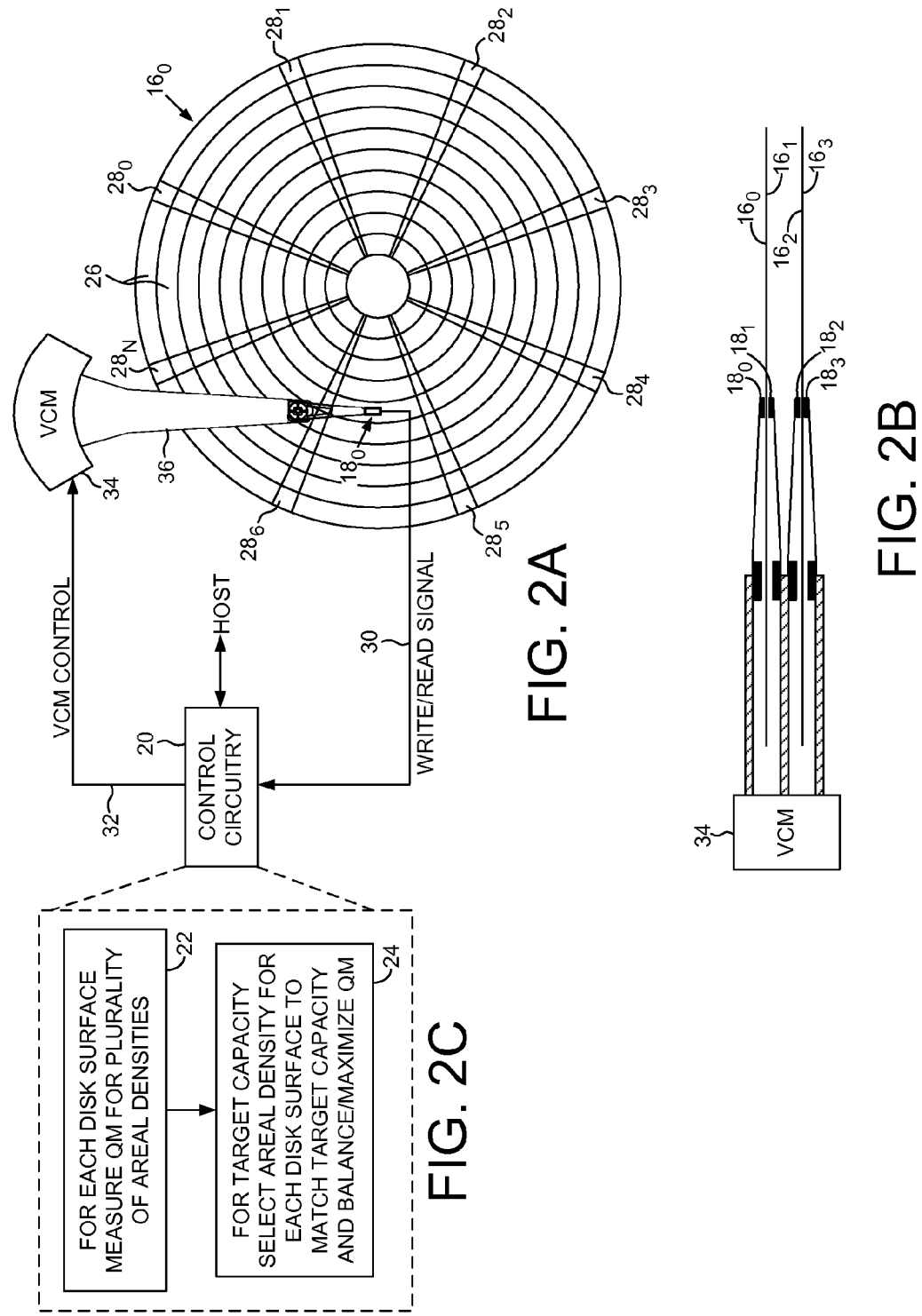
FIGS. 2A and 2B show a data storage device in the form of a disk drive comprising a plurality of disk surfaces and a head actuated over each disk surface.
FIG. 2C is a flow diagram according to an embodiment wherein a quality metric is measured at a plurality of discrete areal densities for each disk surface, and then based on a target capacity an areal density is selected for each disk surface such that the combined areal densities satisfies the target capacity and such that the quality metrics across the disk surfaces are substantially equal and substantially maximized.

FIGS. 2A and 2B show a data storage device in the form of a disk drive according to an embodiment comprising a plurality of disk surfaces $16_0$-$16_3$, and a head 18, actuated over each disk surface $16_i$. The data storage device further comprises control circuitry 20 configured to execute the flow diagram of FIG. 2C, wherein for each disk surface, a quality metric is measured at a plurality of discrete areal densities including a first areal density comprising a first radial density and a first linear density, and a second areal density comprising a second radial density different from the first radial density and a second linear density different from the first linear density (block 22). Based on a target capacity, an areal density is selected for each disk surface such that the combined areal densities satisfies the target capacity and such that the quality metrics across the disk surfaces are substantially equal and substantially maximized (block 24).

In the embodiment of FIG. 2B, the disk drive comprises two disks with a head actuated over each of the top and bottom disk surfaces. However, other embodiments may comprise a single disk or more than two disks. In addition, other embodiments may not comprise a head actuated over each disk surface, for example, the top surface of the top disk and the bottom surface of the bottom disk may remain unused. In the embodiments described herein, there are at least two disk surfaces with at least one head actuated over each of the two disk surfaces.

In the embodiment of FIG. 2A, a plurality of concentric servo tracks 26 are defined by embedded servo sectors $28_0$-$28_N$, wherein concentric data tracks are defined relative to the servo tracks at the same or different radial density. The control circuitry 20 processes a read signal 30 emanating from the head $18_0$ to demodulate the servo sectors and generate a position error signal (PES) representing an error between the actual position of the head and a target position relative to a target track. The control circuitry 20 filters the PES using a suitable compensation filter to generate a control signal 32 applied to a voice coil motor (VCM) 34 which rotates an actuator arm 36 about a pivot in order to actuate the head $18_0$ radially over the disk surface $16_0$ in a direction that reduces the PES. The servo sectors $28_0$-$28_N$ may comprise any suitable head position information, such as a track address for coarse positioning and servo bursts for fine positioning. The servo bursts may comprise any suitable pattern, such as an amplitude based servo pattern or a phase based servo pattern.

Figure 3:
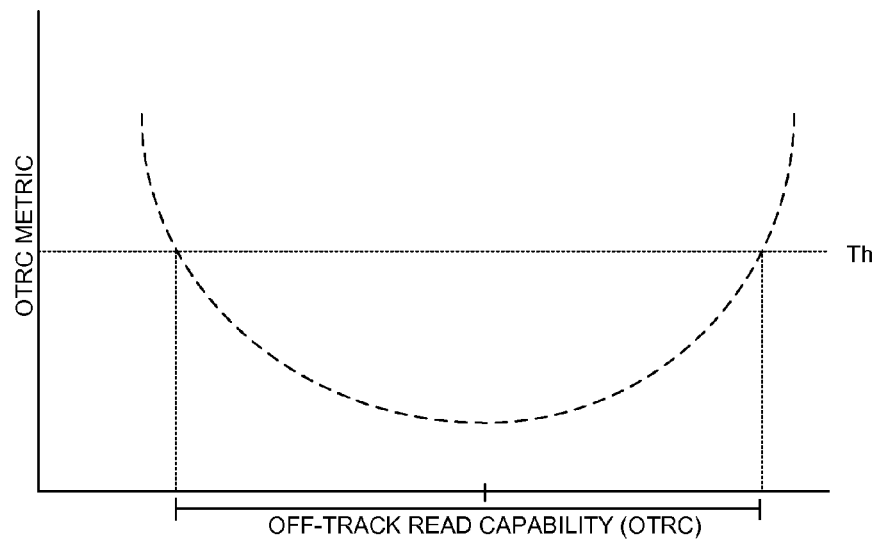
FIG. 3 shows an embodiment wherein the quality metric measured for each areal density comprises an off-track read capability (OTRC).

Any suitable quality metric may be measured for each disk surface at each areal density. FIG. 3 illustrates an example embodiment wherein the quality metric comprises an off-track read capability (OTRC) wherein for a given areal density the ability to read a data track is measured at each of a plurality of off-track offsets. A corresponding OTRC metric is generated for each off-track offset, such as a bit error rate. As the off-track offset increases, the bit error rate increases, wherein the OTRC is defined as the width of the off-track offset relative to a threshold level (Th) for the OTRC metric as illustrated in FIG. 3. A bit error rate metric results in a "bathtub" curve for the OTRC metric with a minimum at zero off-track offset as shown in FIG. 3; however, other OTRC metrics may exhibit an inverted bathtub curve having a maximum at zero off-track offset and an OTRC defined relative to when the OTRC metric falls below a threshold. Any suitable OTRC metric may be evaluated to measure the OTRC, such as the log-likelihood ratios of an iterative correction code or an iterative sequence detector, branch metrics of a Viterbi sequence detector, mean squared error between expected and actual read signal sample values, gain control and/or timing recovery errors, read signal amplitude, etc.

Examples of other quality metrics that may be measured for each disk surface at each areal density include an error rate (e.g., bit error rate) or a squeeze margin defined as an amount of tolerable track squeeze before reaching a suitable metric. In one embodiment, multiple quality metrics may be measured for each disk surface at each areal density and the resulting quality metrics processed in any suitable manner, such considering the maximum, minimum, or computing an average of the quality metrics.

Figure 4:
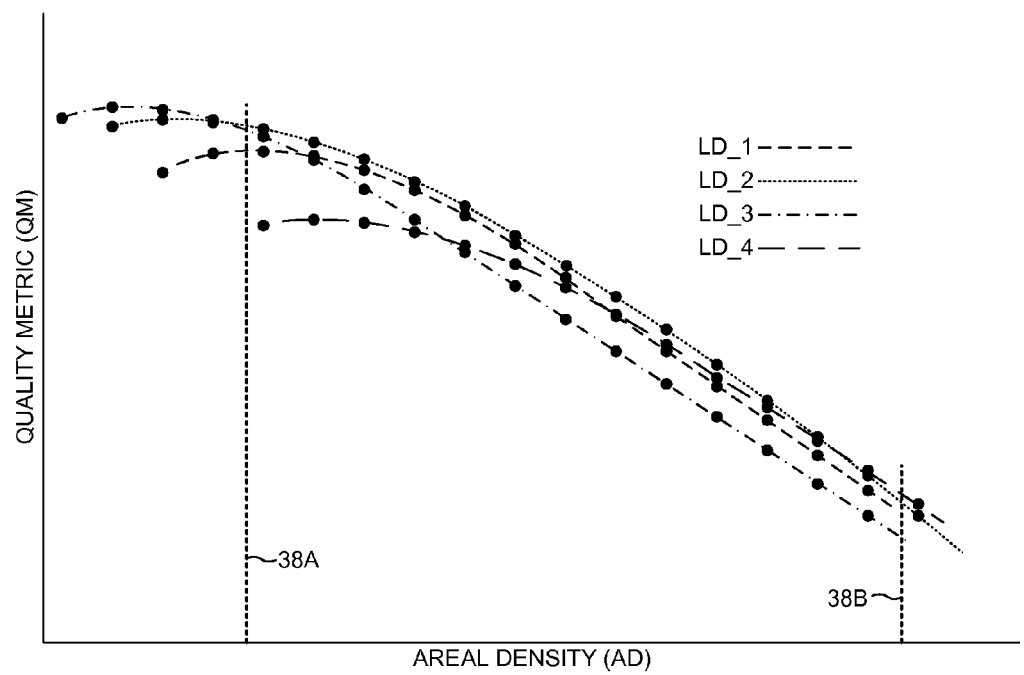
FIG. 4 shows an example of a quality metric measured at a plurality of discrete areal densities for a disk surface.

FIG. 4 illustrates an embodiment wherein a quality metric is measured for a plurality of discrete areal densities (represented by block dots). Each measurement represents a specific radial and linear density, wherein in the embodiment of FIG. 4, the quality metric is measured for a plurality of different radial densities at one of a plurality of linear densities. The resulting measurements are then curve fitted to a polynomial using any suitable technique so that the areal density may be determined for any desired radial density at the corresponding linear density. This illustrated in FIG. 4 where the quality metric is measured for four different linear densities (by varying the radial density) and the resulting measurements curve fitted to four curves each represented by coefficients of a polynomial. FIG. 4 also illustrates that for a given areal density, there is a linear density (and corresponding radial density) that maximizes the quality metric. For example, at the areal density 38A the quality metric is maximum at linear density LD_2, and at the areal density 38B the quality metric is maximum at linear density LD_4. Accordingly, in one embodiment the areal density space (represented by the possible radial and linear densities) versus the quality metric is searched in order to select an areal density for each disk surface that achieves a target capacity as well as balances (makes substantially equal) and maximizes the quality metrics so that each disk surface provides a similar recording quality.

Figure 5:
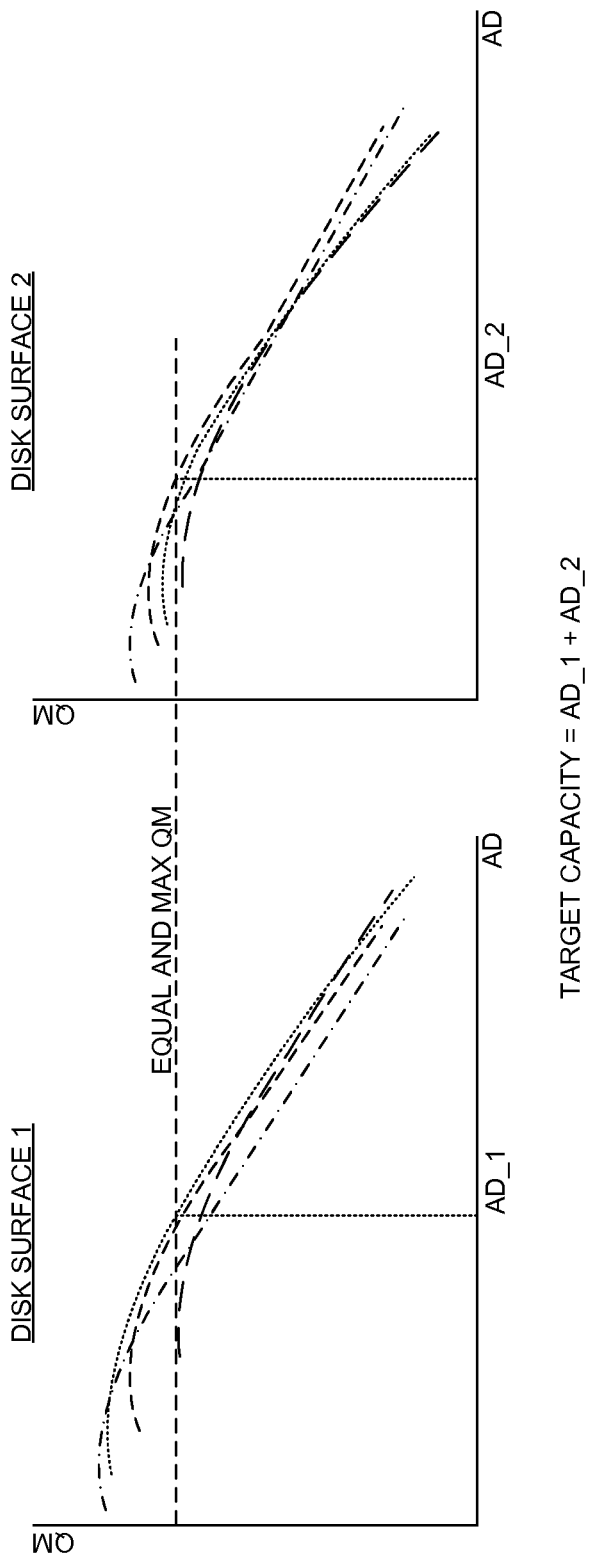
FIG. 5 shows an example of an areal density selected for two disk surfaces such that the corresponding quality metrics are substantially equal and substantially maximized.

An example of this embodiment is illustrated in FIG. 5 which shows the areal density curves generated for a first and second disk surface. By searching these areal density spaces using any suitable technique (e.g., interpolation and extrapolation using curve fitted polynomials), it is possible to select an areal density (radial and linear density) for each disk surface that achieves a target capacity as well as balances (makes substantially equal) and maximizes the quality metrics so that each disk surface provides a similar recording quality. That is, there is a point in each areal density space where the combined areal densities will substantially equal a target capacity as well as result in substantially equal quality metrics that are maximized. By measuring discrete points in the areal density space, a near optimal areal density may be selected for each disk surface by interpolating/extrapolating the discrete points (e.g., using polynomials), or by rounding to the nearest discrete point.

In one embodiment, searching for the optimal points of areal density for each disk surface may involve setting a very high quality metric and determining whether the target capacity may be achieved by selecting corresponding points in the areal density space of each disk surface. If not, the quality metric may be reduced and the process repeated until the target capacity is achieved. The example of FIG. 5 which shows the balancing/maximizing of the quality metric for two disk surfaces may be extended to any suitable number of disk surfaces. In another embodiment, each disk surface may be divided into a number of zones, where each zone comprises a number of consecutive servo tracks. The above process may then be repeated for each zone of each disk surface in order to optimize the areal density for each zone (i.e., select an optimal radial and linear density for each zone).

Figure 6:
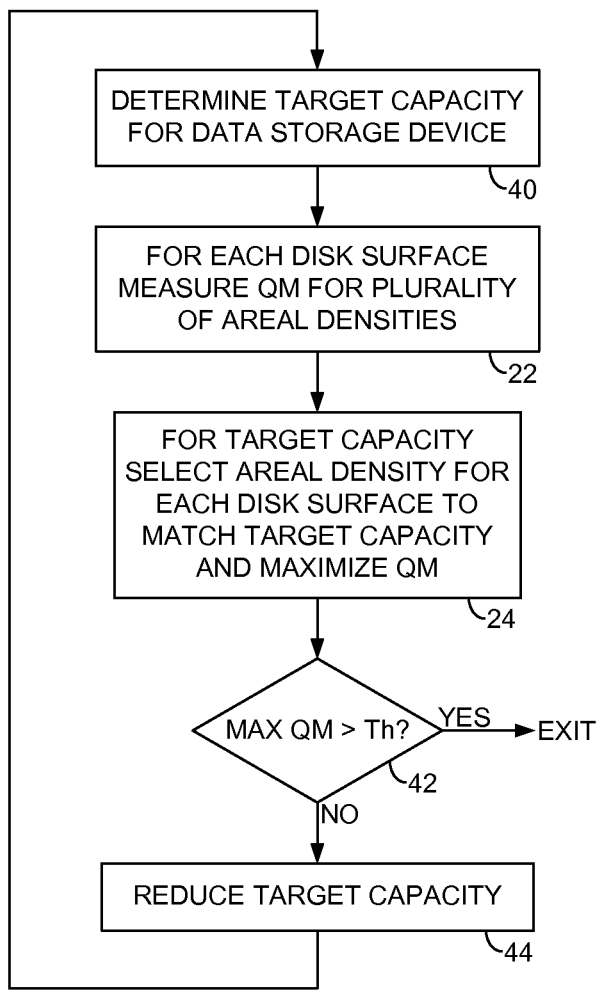
FIG. 6 is a flow diagram according to an embodiment wherein if after selecting the areal densities for the disk surfaces the balanced quality metric is less than a threshold, the target capacity is reduced and the process of selecting the areal density for each disk surface is repeated.

FIG. 6 is a flow diagram according to an embodiment which extends on the flow diagram of FIG. 2C, wherein a target capacity for the data storage device is determined (block 40), for example, as part of a manufacturing procedure. After measuring the plurality of discrete areal densities for each disk surface (block 22) and selecting the areal densities to balance/maximize the quality metrics across the disk surfaces (block 24), the resulting quality metric is evaluated at block 42. If the maximum quality metric for the selected areal densities corresponds to an insufficient recording quality (e.g., if the maximum quality metric is less than a threshold in the example of FIG. 6), the target capacity for the disk drive may be reduced and the process repeated. That is, the data storage device may be "waterfalled" into a lower capacity product that may be marketed and sold as such.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a plurality of disk surfaces;
   a head actuated over each disk surface; and
   control circuitry configured to:
      for each disk surface, measure a quality metric at a plurality of discrete areal densities including:
         a first areal density comprising a first radial density and a first linear density; and
         a second areal density comprising a second radial density different from the first radial density and a second linear density different from the first linear density; and
      based on a target capacity, select an areal density for each disk surface such that the combined areal densities satisfies the target capacity and such that the quality metrics across the disk surfaces are substantially equal and substantially maximized.

2. The data storage device as recited in claim 1, wherein the control circuitry is further configured to generate a polynomial representing a relationship between the areal density and the quality metrics measured a first disk surface.

3. The data storage device as recited in claim 2, wherein the control circuitry is further configured to select the areal density for the first disk surface based on the polynomial.

4. The data storage device as recited in claim 2, wherein the control circuitry is further configured to generate coefficients for a plurality of the polynomials wherein each polynomial corresponds to a discrete linear density for the first disk surface.

5. The data storage device as recited in claim 4, wherein the control circuitry is further configured to select the areal density for the first disk surface based on the plurality of polynomials.

6. The data storage device as recited in claim 5, wherein the control circuitry is further configured to select a linear density for the first disk surface based on the selected areal density for the first disk surface and the plurality of polynomials.

7. The data storage device as recited in claim 1, wherein the control circuitry is further configured to reduce the target capacity when the maximum quality metric for the selected areal densities corresponds to an insufficient recording quality.

8. The data storage device as recited in claim 1, wherein the quality metric comprises an off-track read capability.

9. The data storage device as recited in claim 1, wherein the quality metric comprises an error rate.

10. The data storage device as recited in claim 1, wherein the quality metric comprises a squeeze margin.

11. A method of operating a data storage device comprising:
    for each of a plurality of disk surfaces, measuring a quality metric at a plurality of discrete areal densities including:
       a first areal density comprising a first radial density and a first linear density; and
       a second areal density comprising a second radial density different from the first radial density and a second linear density different from the first linear density; and
    based on a target capacity, selecting an areal density for each disk surface such that the combined areal densities satisfies the target capacity and such that the quality metrics across the disk surfaces are substantially equal and substantially maximized.

12. The method as recited in claim 11, further comprising generating a polynomial representing a relationship between the areal density and the quality metrics measured a first disk surface.

13. The method as recited in claim 12, further comprising selecting the areal density for the first disk surface based on the polynomial.

14. The method as recited in claim 12, further comprising generating coefficients for a plurality of the polynomials wherein each polynomial corresponds to a discrete linear density for the first disk surface.

15. The method as recited in claim 14, further comprising selecting the areal density for the first disk surface based on the plurality of polynomials.

16. The method as recited in claim 15, further comprising selecting a linear density for the first disk surface based on the selected areal density for the first disk surface and the plurality of polynomials.

17. The method as recited in claim 11, further comprising reducing the target capacity when the maximum quality metric for the selected areal densities corresponds to an insufficient recording quality.

18. The method as recited in claim 11, wherein the quality metric comprises an off-track read capability.

19. The method as recited in claim 11, wherein the quality metric comprises an error rate.

20. The method as recited in claim 11, wherein the quality metric comprises a squeeze margin.

* * * * *